Oct. 23, 1934. C. G. MUNTERS ET AL Re. 19,350

REFRIGERATION

Original Filed Aug. 1, 1930

INVENTORS
Carl Georg Munters
BY Sigurd Mattias Backström
John T. Nedland
their ATTORNEY Reissued Oct. 23, 1934

Re. 19,350

UNITED STATES PATENT OFFICE 19,350

REFRIGERATION

Carl Georg Munters and Sigurd Mattias Bäckström, Stockholm, Sweden, assignors to Platen-Munters Refrigerating System Aktiebolag, Stockholm, Sweden, a corporation of Sweden Original No. 1,864,608, dated June 28, 1932, Serial No. 472,221, August 1, 1930. Application for reissue June 12, 1934, Serial No. 730,348. In Germany August 2, 1929

36 Claims. (Cl. 62—169)

Our invention relates to a method of, and apparatus for producing refrigeration in connection with internal combustion engines for automobiles, motor boats, or like vessels, although, as will appear, it can be utilized also on motor railways or in connection with stationary engines.

The objects, nature and advantages of our invention will be apparent from the following description taken in connection with the accompanying drawing, which forms a part of this specification, and of which:

Figure 1:
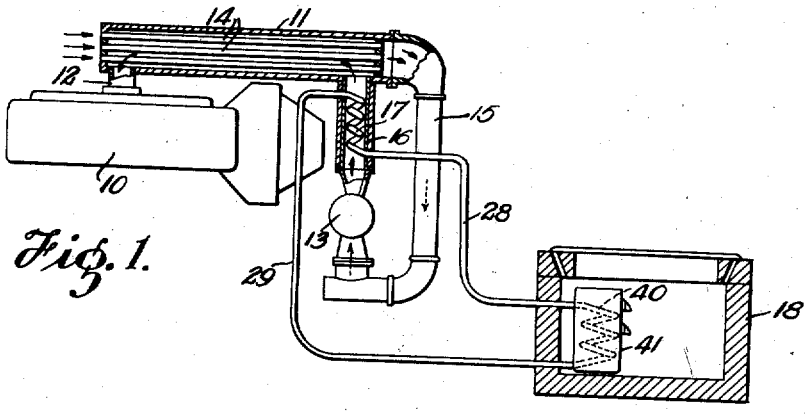
Fig. 1 is a view, partially in cross-section, of one embodiment of our invention involving an internal combustion engine.

In Fig. 1, reference character 10 designates a cylinder block of an internal combustion engine, for example, for an automobile. 11 is a supply pipe or duct for the air-gas mixture which is supplied through the suction inlet 12 to the usual engine manifold and the cylinders. The gasifier or carburetor 13 of the machine is supplied with fresh air through a conduit 15 and narrow tubes 14 arranged in heat exchange relation with the duct or conduit 11. Between the carburetor 13 and the pipe 11 is arranged a well-insulated vaporization chamber or conduit member 16 which forms a part of the duct leading to the intake manifold and which serves for the production of cold. Within this chamber is located a pipe coil 17 which is connected by conduits 28 and 29 with a second pipe coil 40 which is surrounded by a cooling body 41 located within a refrigerating cabinet 18. The pipe coils and their connecting conduits contain an auxiliary medium which absorbs heat from the refrigerating cabinet 18 and transfers this heat to the chamber 16 where the heat produces evaporation of the fuel for the engine. The auxiliary medium is caused to evaporate in the coil 40 and to condense in the coil 17.

The manner of operation of the above-described device is as follows:

The fresh air necessary for combustion flows from the atmosphere into the narrow pipes 14 and flows through the conduit 15 to the carburetor 13 in which the fuel, for example, liquid benzine or gasoline, is atomized and passes in a finely divided condition into the vaporization chamber 16 in which the small liquid particles are evaporated. Within chamber 16 there is a pressure below atmospheric due to the suction produced by the piston and cylinder mechanism 10, and this reduced pressure increases the rate of evaporation of the fuel. Due to this evaporation, heat is taken from the surroundings, and this heat, as the chamber 16 is well insulated externally, can only be withdrawn from the inside of the chamber, that is, from the coil 17. In its further passage, the air, saturated with fuel vapor, flows through the duct 11 and through the suction inlet 12 into the cylinders of the engine after cooling the incoming fresh air in the heat exchanger 11, 14. In consequence of this cooling, the temperature of the air sinks lower and lower until a definite minimum temperature is reached.

As will be obvious, the lowest air temperature prevails in the chamber 16, and the cold is transferred from this cold producer through the pipe coil 17 to the part to be cooled, in the present case the refrigerating cabinet 18, with the assistance of the auxiliary fluid, in known manner. The chamber 16 can obviously also be constructed so as to be adapted to absorb heat directly from the object to be cooled, in which case the transfer of cold is effected without special coils and auxiliary fluids or the like. As a gasifier, the usual carburetor of such a machine can be utilized, so that the construction of the present arrangement can actually be limited to the insertion of the chamber 16 behind the carburetor and the intake of the engine, and of a heat exchanger, a construction which can easily be effected and without great cost in existing vehicles.

Figure 2:
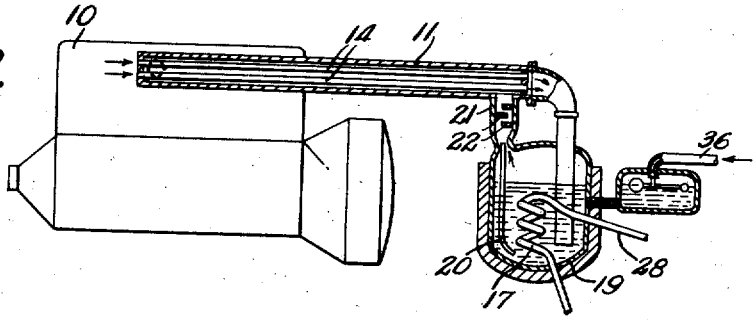
Fig. 2 is a view, partially in cross-section, of a modified embodiment of our invention.

The device illustrated in Fig. 2 differs from that of Fig. 1 in that the incoming fresh air passes through the liquid fuel in the container 19 so that the air becomes saturated with fuel vapors. The reduced pressure obtaining in container 19, due to the engine suction, aids in causing evaporation of the liquid fuel therein. The amount of heat necessary for vaporizing the fuel can be removed directly from the contents of the container 19, heat being thus extracted from the outside so that the container 19 (gasifier) acts at the same time as a cold producer. In this case, as is described in the first embodiment, an auxiliary medium which circulates in pipe coils or the like, with alternate evaporation and condensation, may be utilized and heat may be absorbed from any suitable point.

The heat exchanger 11, 14 illustrated in Fig. 2, corresponds to that of Fig. 1. Since, in the container 19, the more volatile portion of the benzine or gasoline evaporates first, there preferably is provided a device which ensures that the heavier parts of the fuel also will be evaporated. The pipe 20 effects this purpose and opens at the top in a nozzle-formed restriction of the pipe 21 which connects the container 19 with the supply pipe 11 for the passage of the air-gas mixture to the cylinders. At its lower end, the pipe 20 extends substantially to the bottom of the container 19. On withdrawal of the air-gas mixture from the container 19 a suction is produced in pipe 20 by which the heavier fuel is withdrawn from the bottom of the container 19 and is introduced into the stream of the air-gas mixture and thereby into the cylinder of the machine. The liquid-separating device 22, provided in the conduit 21, prevents the larger fuel particles being carried along into the cylinders of the machine. These flow back into container 19. The supply of fuel to container 19 is effected through the conduit 36 by means of the customary float valve.

Figure 3:
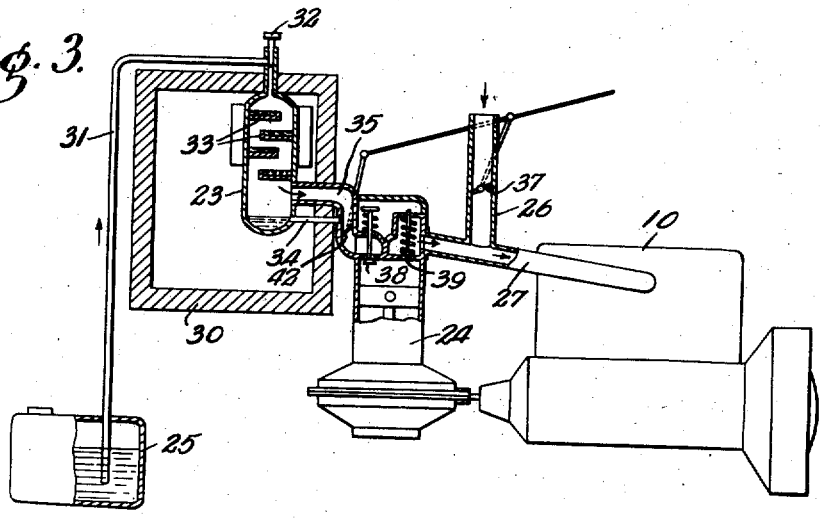
Fig. 3 is a view, partially in cross-section, of a further modification.

In the described embodiments, the evaporation or gasification of the fuel is effected by means of the air of combustion. The air is thus considerably cooled down and losses result. This disadvantage is avoided in the embodiment illustrated in Fig. 3, in that the evaporation of the fuel does not take place in the presence of the air of combustion, but in a special vaporization chamber 23 in which a low pressure is produced by means of the pump 24 which causes the liquid fuel entering the chamber 23 from the supply chamber 25 to evaporate. The pump is constructed as a suction and pressure pump, so that the fuel vapors which are subjected to low pressure can be compressed before they are introduced into the fresh air flowing through conduit 26, together with which they flow through conduit 27 into the cylinder of the engine. The suction and pressure valves of the pump are denoted by 38, 39.

Around the low pressure container is constructed an insulated chamber 30 which serves as a cooling chamber, from the inner space of which the heat necessary for vaporization of the fuel is withdrawn, thus producing cold, which serves for cooling objects inserted in chamber 30, or even for the production of ice or the like. The supply of liquid fuel into the low pressure vaporizer 23 is effected from supply chamber 25 through the conduit 31. This can be regulated as desired by means of the adjusting screw 32. After its entry into the chamber 23 the fuel trickles down over the distributing plates 33, arranged in this chamber, where it evaporates.

This apparatus also assures that the heavier constituents of the fuel which collect in the lower part of the container 23 will be vaporized and utilized in the motor, the heavier constituents flowing through the connection 34 to the suction conduit 35 and thence to the pump. In conduit 35 a throttle valve 42 is provided. A similar valve 37 is located in the supply pipe 26 for the incoming fresh air, the two valves being operable in common.

The pump 24, as can be seen from the drawings, is driven from the internal combustion engine.

The practical carrying out of the principle of the invention can be effected in different ways and obviously, in the embodiments described, which are merely for explanatory purposes, all devices can be utilized which are known in connection with refrigerating machines and also known in general in connection with machines to which the invention can be applied. Obviously, also, provision may be made for cutting the cold-producing device in and out as desired.

Having now particularly described and ascertained the nature of our said invention and in what manner the same is to be performed we declare that what we claim is:

1. The method of refrigerating with the aid of an internal combustion engine which consists in vaporizing a liquid fuel to form a combustible mixture, introducing said mixture into said engine and supplying heat for vaporizing said fuel by conduction from a body to be cooled external to the path of flow of said combustible mixture.

2. The method of refrigerating with the aid of an internal combustion engine which consists in producing a region of low pressure by the action of said engine, introducing liquid fuel into said region, vaporizing said fuel to form a combustible mixture, introducing said mixture into said engine, and supplying heat for vaporizing said fuel by conduction from a body to be cooled external to the path of flow of said combustible mixture.

3. The method of refrigerating with the aid of an internal combustion engine which consists in producing a region of low pressure by the suction action of said engine, introducing liquid fuel and air into said region, vaporizing said fuel to form a combustible mixture of fuel and air, introducing said mixture into said engine and supplying heat for vaporizing said fuel by conduction from an insulated body to be cooled external to the path of flow of said combustible mixture.

4. The method of refrigerating with the aid of an internal combustion engine which consists in producing a region of low pressure by the suction action of said engine, introducing air into said region, atomizing liquid fuel in said region, vaporizing said fuel to form a combustible mixture of fuel and air, introducing said mixture into said engine and supplying heat for vaporizing said fuel from a body to be cooled.

5. A refrigerating apparatus comprising an internal combustion engine, a vaporization chamber, means for maintaining a low pressure in said chamber by the action of said motor, means for supplying liquid fuel and air for said motor to said chamber, a body to be cooled separate from said vaporization chamber and fluid therein, and means for conducting heat from said body to the liquid in said chamber.

6. Refrigerating apparatus comprising an internal combustion engine, a supply duct for said engine, means for supplying liquid fuel and air to said duct, a body to be cooled external to said duct, and means for conducting heat from said body to the liquid fuel within said duct.

7. Refrigerating apparatus comprising an internal combustion engine, a supply duct for said engine, a carburetor for supplying air and atomized fuel to said duct, a body to be cooled external to said duct, and means for conducting heat from said body to the fuel within said duct.

8. Refrigerating apparatus comprising an internal combustion engine, a heat insulated chamber connected to supply fluid to said engine, means for supplying air and liquid fuel to said chamber, a body to be cooled, and means for conducting heat from said body to the liquid fuel within said heat insulated chamber.

9. Refrigerating apparatus comprising an internal combustion engine, a heat insulated chamber connected to supply fluid to said engine, a carburetor for supplying air and atomized fuel to said chamber, a body to be cooled, and means for conducting heat from said body to the fuel within said heat insulated chamber.

10. Refrigerating apparatus comprising an internal combustion engine, a supply duct connected to supply fluid thereto, a carburetor for supplying air and atomized fuel to said supply duct, a conduit for supplying air to said carburetor, said conduit being in heat exchange relation with a portion of said supply duct, a body to be cooled, and means for transferring heat from said body to the fuel within another portion of said supply duct.

11. Refrigerating apparatus comprising an internal combustion engine, a supply duct connected to supply fluid thereto, a carburetor for supplying air and atomized fuel to said supply duct, a conduit for supplying air to said carburetor, said conduit being in heat exchange relation with a portion of said supply duct, another portion of said supply duct being heat insulated, a body to be cooled, and means for transferring heat from said body to the fuel within the insulated portion of said supply duct.

12. A refrigerating apparatus comprising an internal combustion engine, a pump operatively connected to said engine, a body to be cooled, a vaporization chamber in heat exchange relation with said body, means for introducing liquid fuel for said engine into said vaporization chamber, a conduit connecting said vaporization chamber with the intake of said pump, a conduit connecting the exhaust of said pump with the intake of said motor, and means for introducing air into said last mentioned conduit.

13. Refrigerating apparatus adapted to be operated by suction-producing internal combustion engine mechanism having an intake, including a suction line communicating with said intake, a chamber in communication with the suction line, means for discharging volatile liquid fuel into the chamber, and a refrigerating cabinet external to and in heat transfer relation with said chamber.

14. In combination with suction-producing internal combustion engine mechanism having an intake, refrigerating apparatus including a chamber in communication with said intake, means for supplying volatile liquid fuel to the chamber while reducing the effective pressure thereof, and a refrigerating cabinet external to and in heat transfer relation with said chamber.

15. In combination, a vehicle driven by an internal combustion engine, a refrigerator adapted to be operated by the engine mechanism of the vehicle including a reduced pressure chamber in communication with the intake manifold of the engine, an air intake for the chamber, an atomizing device in the air intake, means for supplying a volatile liquid to the atomizing device, and a refrigerating cabinet external to and in heat transfer relation with said chamber.

16. In combination, a vehicle driven by an internal combustion engine, a refrigerator adapted to be operated by the engine mechanism of the vehicle including a reduced pressure chamber in communication with the intake manifold of the engine, an air intake for the chamber, an atomizing device in the air intake, means operable by the flow of air through the air intake for supplying a volatile liquid to the atomizing device, and a refrigerating cabinet external to and in heat transfer relation with said chamber.

17. Refrigerating apparatus adapted to be operated by suction-producing internal combustion engine mechanism having an intake, including a suction line communicating with said intake, a reduced pressure chamber in communication with the suction line, a liquid container mounted in the chamber, and means for discharging an atomized volatile liquid into the chamber.

18. Refrigerating apparatus adapted to be operated by suction-producing internal combustion engine mechanism having an intake including a suction line communicating with said intake, a reduced pressure chamber in communication with the suction line, ice-producing means in heat exchange relation with said chamber, and means for supplying volatile liquid fuel to the chamber.

19. In combination, an internal combustion engine, a conduit connected to said engine for supplying air thereto, means to introduce liquid fuel into said conduit to vaporize therein and produce a combustible gas mixture, a refrigerating cabinet, and heat transfer means between said conduit and said refrigerating cabinet.

20. In combination, an internal combustion engine, a conduit connected to said engine for supplying air thereto, means to introduce liquid fuel into said conduit to vaporize therein and produce a combustible gas mixture, a refrigerating cabinet, a cooling body in said refrigerating cabinet, and heat transfer means between said conduit and said cooling body.

21. In combination, an internal combustion engine, a conduit connected to said engine for supplying air thereto, means to introduce liquid fuel into said conduit to vaporize therein and produce a combustible gas mixture, a refrigerating cabinet, and means providing a closed fluid circulation circuit between said conduit and said refrigerating cabinet.

22. In combination, an internal combustion engine, a conduit connected to said engine for supplying air thereto, means to introduce liquid fuel into said conduit to vaporize therein and produce a combustible gas mixture, a refrigerating cabinet, and a vaporization-condensation circuit between said conduit and said refrigerating cabinet.

23. In combination with suction-producing internal combustion engine mechanism having an intake, suction-producing refrigerating apparatus including a chamber in communication with said intake, a refrigerating cabinet external to and in heat transfer relation with said chamber, and means for discharging an atomized volatile liquid into the chamber including an air intake for the chamber, an atomizing device in the air intake, and a liquid supply line discharging at the atomizing device.

24. In combination with suction-producing internal combustion engine mechanism having an intake, refrigerating apparatus including a chamber in communication with said intake, a refrigerating cabinet external to and in heat transfer relation with said chamber, and means for discharging an atomized volatile liquid into the chamber including an air intake for the chamber, an atomizing device in the air intake, and means operable by the flow of air through the air intake for supplying a volatile liquid to the atomizing device.

25. Refrigerating apparatus adapted to be operated by suction-producing internal combustion engine mechanism having an intake, including a suction line communicating with said intake, a chamber in communication with the suction line, a refrigerating cabinet external to and in heat transfer relation with said chamber, and means for discharging an atomized volatile liquid into the chamber including an air intake for the chamber, and a carburetor in the air intake.

26. Refrigerating apparatus adapted to be operated by suction-producing internal combustion engine mechanism having an intake, including a suction line communicating with the intake, a chamber in communication with the suction line, a refrigerating cabinet external to and in heat transfer relation with said chamber, and means for discharging an atomized volatile liquid into the chamber including an air intake for the chamber, an atomizing device at the air intake, and means for supplying liquid to the atomizing device.

27. Refrigerating apparatus adapted to be operated by suction-producing internal combustion engine mechanism having an intake, including a suction line communicating with said intake, a chamber in communication with the suction line, a refrigerating cabinet external to and in heat transfer relation with said chamber, means for discharging an atomized volatile liquid into the chamber including an air intake for the chamber, an atomizing device at the air intake, a reservoir, and a supply line from the reservoir discharging at the atomizing device.

28. Refrigerating apparatus adapted to be operated by suction-producing internal combustion engine mechanism having an intake, including a chamber in communication with said intake; means operable by the suction from the intake manifold for passing an atomized volatile liquid into the chamber including an air intake for the chamber having a restricted portion, and a liquid supply line discharging at the restricted portion of the air intake; a refrigerating cabinet external to said chamber; and means for cooling said refrigerating cabinet due to evaporation of said liquid.

29. Refrigerating apparatus adapted to be operated by suction-producing internal combustion engine mechanism having an intake, including a chamber in communication with said intake; means operable by the suction from the intake for passing an atomized volatile liquid into the chamber including an air intake for the chamber having a restricted portion, a liquid reservoir, and a supply conduit extending from the reservoir and discharging at the restricted portion of the air intake toward the chamber so that liquid is drawn from the reservoir; a refrigerating cabinet external to said chamber; and means for cooling said refrigerating cabinet due to evaporation of said liquid.

30. Refrigerating apparatus adapted to be operated by suction-producing internal combustion engine mechanism having an intake, including a chamber in communication with said intake; means operable by the suction from the intake manifold for passing an atomized volatile liquid into the chamber including an air intake for the chamber, a restricted choke tube in the air intake, a liquid reservoir, and a conduit from the reservoir discharging in the choke tube toward the chamber; a refrigerating cabinet external to said chamber; and means for cooling said refrigerating cabinet due to evaporation of said liquid.

31. Refrigeration apparatus including an internal combustion engine, a supply tank for liquid fuel, a conduit for fuel to said engine, means for controlling flow of liquid fuel during operation of said engine from a higher pressure in said tank into said conduit at a lower pressure, and a thermally insulated storage compartment containing part of said conduit adjacent said control means.

32. Refrigeration apparatus including an internal combustion engine, a supply tank for liquid fuel, a conduit for fuel to said engine, a valve for controlling flow of liquid fuel during operation of said engine from a higher pressure in said tank into said conduit at a lower pressure, and a thermally insulated storage compartment containing part of said conduit adjacent said control means.

33. Refrigeration apparatus including an internal combustion engine, a storage tank for liquid fuel, a thermally insulated storage compartment, a conduit for fuel to said engine including a vaporization chamber in said storage compartment, and means for controlling flow of liquid fuel during operation of said engine from a higher pressure in said storage tank into said vaporization chamber at a lower pressure.

34. Refrigeration apparatus including an internal combustion engine, a storage tank for liquid fuel, a thermally insulated storage compartment, a conduit for fuel to said engine including a vaporization chamber in said storage compartment, and a valve for controlling flow of liquid fuel during operation of said engine from a higher pressure in said storage tank into said vaporization chamber at a lower pressure.

35. The method of refrigeration with the aid of an internal combustion engine operating on liquid fuel and air supplied thereto which comprises vaporizing said liquid fuel, supplying heat for said vaporization by conduction from a body to be cooled external to the path of flow of the fluids supplied to the engine, forming a combustible mixture of the vaporized fuel, and introducing the combustible mixture into said engine.

36. The method of refrigeration with the aid of an internal combustion engine operating on liquid fuel and air supplied thereto which comprises admitting said liquid fuel to a region of lower pressure and supplying heat by conduction from a body to be cooled external to the path of flow of the fluids supplied to the engine to cause vaporization of the fuel, forming a combustible mixture of the vaporized fuel, and introducing the combustible mixture into said engine.

CARL GEORG MUNTERS.
SIGURD MATTIAS BÄCKSTRÖM.